United States Patent
Shirasaka et al.

[11] Patent Number: 5,323,632
[45] Date of Patent: Jun. 28, 1994

[54] CALKING STRUCTURE AND JIG INTENDED FOR CALKING

[75] Inventors: Takeshi Shirasaka; Hiroyasu Takemura, both of Furukawa, Japan

[73] Assignee: Alps Electric Co., Ltd., Tokyo, Japan

[21] Appl. No.: 881,101

[22] Filed: May 11, 1992

[30] Foreign Application Priority Data

May 13, 1991 [JP] Japan .................. 3-42307

[51] Int. Cl.$^5$ .................. B71D 28/00
[52] U.S. Cl. .................. 72/325; 29/33 K; 29/243.5; 29/566.1
[58] Field of Search ........... 403/247, 248, 250, 274, 403/206, 215, 230, 253, 254, 277, 280, 282, 404; 411/504, 502, 503, 501; 439/877, 879; 29/513, 509, 243.5, 33 K, 566, 566.1; 72/325

[56] References Cited

U.S. PATENT DOCUMENTS

| | | | |
|---|---|---|---|
| 1,656,856 | 1/1928 | Gagnon | 403/282 X |
| 2,146,128 | 2/1939 | Oldham | 29/509 |
| 3,091,838 | 6/1963 | Hild et al. | 29/509 |
| 3,169,418 | 2/1965 | Borowsky | 29/509 |
| 3,182,276 | 5/1965 | Ruehlemann | 29/513 |
| 3,319,324 | 5/1967 | Keller | 29/566.1 |
| 4,404,835 | 9/1983 | Frith | 72/325 |
| 5,207,084 | 5/1993 | West et al. | 72/325 |

FOREIGN PATENT DOCUMENTS

2-11232 1/1990 Japan .

*Primary Examiner*—Randolph A. Reese
*Assistant Examiner*—George D. Spisich
*Attorney, Agent, or Firm*—Guy W. Shoup; Patrick T. Bever

[57] ABSTRACT

A calking structure wherein a calked member is calked firmly in a fixed member and a jig intended for obtaining the structure are disclosed. Cutting edges 2a, 2b of calking jigs 15, 16 are provided with slant faces 3a or 3b, 3c for subjecting calking pieces 21a, 21b to a torsional deformation with reference to a cut face A from depression, and the calking pieces 21a, 21b are locked to a fixed member 8 as deformed torsionally to a calked member 20.

3 Claims, 7 Drawing Sheets

CALKING STRUCTURE AND JIG INTENDED FOR CALKING

BACKGROUND OF THE INVENTION

1. Field of the Invention

This invention relates to a calking structure wherein a calked member is calked in a fixed member at a peripheral edge portion of a calking aperture formed on the fixed member and a jig intended for calking.

2. Description of the Prior Art

A prior art calking structure and a jig intended for calking will be described with reference to FIG. 7 to FIG. 10. Here, FIG. 7 is a perspective view showing a prior art calking structure, FIG. 8 is a perspective view showing a construction of a prior art jig intended for calking, FIG. 9 (a) and (b) are a front view and a bottom view showing a construction of the prior art jig intended for calking respectively, and FIG. 10 (a) and (b) are explanatory drawings of a calking process.

Figure 8:
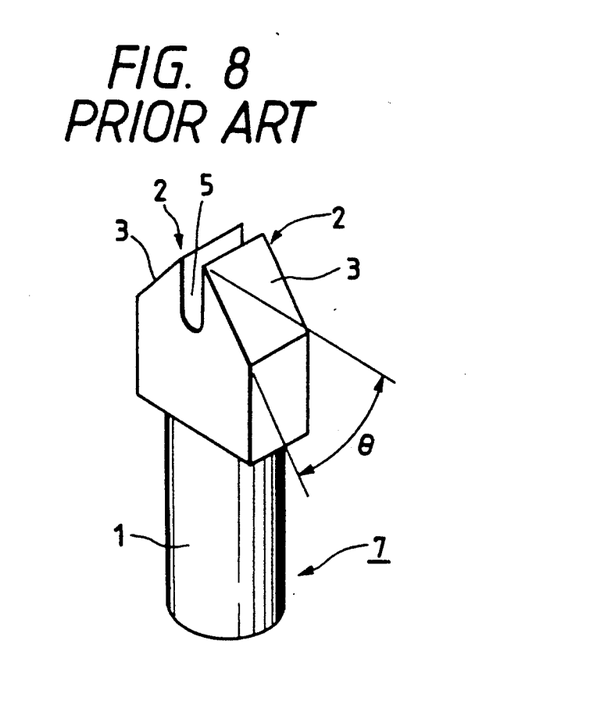
FIG. 8 is a perspective view of a prior art calking jig.
Figure 9A:
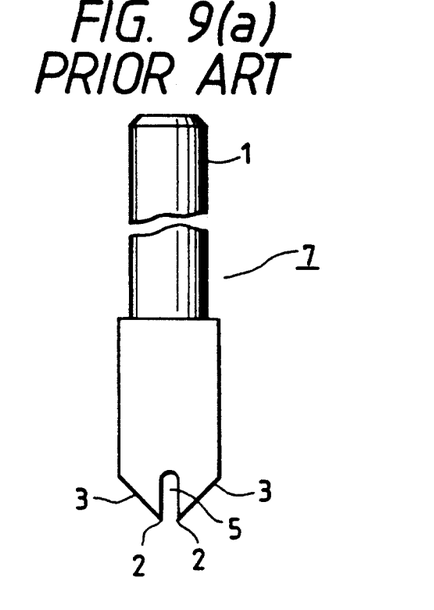
FIG. 9(a) is a side view of the prior art calking jig.
Figure 9B:
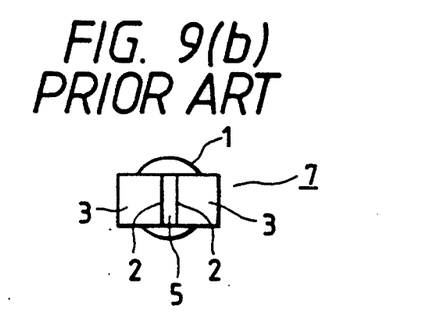
FIG. 9(b) is a bottom view of the prior art calking jig.

As illustrated in FIG. 8, a prior art calking jig 7 is provided with a pair of cutting edges 2, 2 on an end portion of a shaft 1, the cutting edges 2, 2 having slant faces 3, 3 formed on opposite nose sides at an angle $\theta$ and a recessed groove 5 provided centrally of the nose.

Figure 10A:
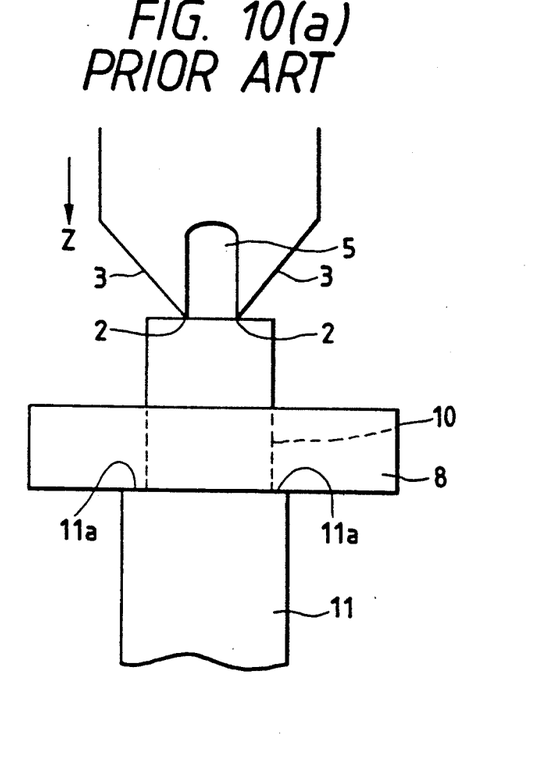
FIG. 10(a) is a side view before the forming of the prior art calking structure.
Figure 10B:
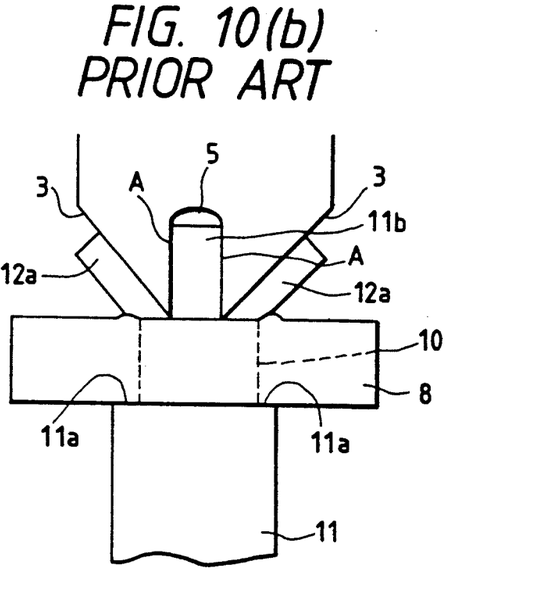
FIG. 10(b) is a side view after the forming of the prior art calking structure.

A process for calking by means of the calking jig 7 constructed as above will now be described. A rectangular calking aperture 10 is formed on a fixed member 8 such as bus bar or the like shown in FIG. 7 and FIG. 10 (a), a nose portion of a calked member 11 such as fixed contact or the like is inserted in the calking aperture 10, and a tier 11a of the calked member 11 is brought into contact with a back side of the fixed member as shown in FIG. 10 (a). The cutting edges 2, 2 of the calking jig 7 are kept facing on a nose surface of the calked member 11 inserted through the calking aperture 10 in the state of FIG. 10 (a), and from thrusting the calking jig 7 in the direction indicated by an arrow Z, the calked member 11 is cut in on its opposite sides as leaving a salient 11b as shown in FIG. 10 (b), and thus a pair of calking pieces 12a, 12b are formed. Then, from thrusting the calking jig 7 further, the calking pieces 12a, 12b having a cut formed thereon are deformed by the slant faces 3 in the direction orthogonal to opposite sides (cut faces A) of the calked member 11, depressed onto the slant faces 3 at the same time and thus cut into an edge portion of the calking aperture 10 of the fixed member 8.

Figure 7:
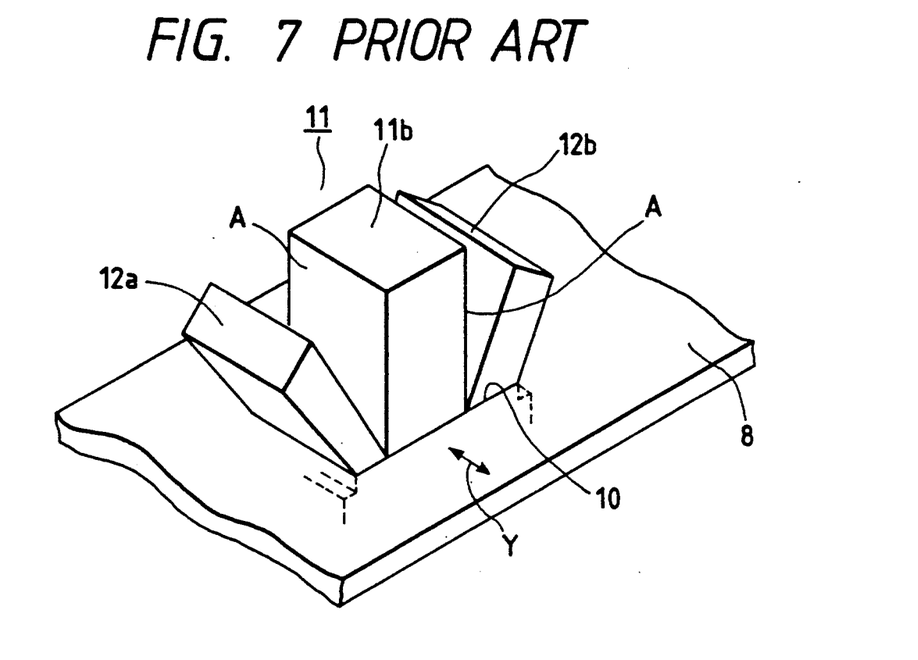
FIG. 7 is a perspective view of a prior art calking structure.

The prior art calking structure is obtained through such process as shown in FIG. 7.

However, in the prior art calking structure mentioned above, the calking pieces 12a, 12b are calked in the fixed member 8 only at opposite end edge portions longitudinal of the calking aperture 10, therefore play or motion of the calked member 11 relative to the fixed member can arise in the directions indicated by an arrow Y in FIG. 7, and the structure cannot thoroughly be fixed mechanically. Thus in such prior art calking structure, it was necessary that an adhesive be applied between the calking pieces 12a, 12b and the fixed member 8 for locking the calked member 11 firmly to the fixed member 8 to complicatedness, and in addition, a problem is quite unavoidable in the aspect of manufacturing cost.

SUMMARY OF THE INVENTION

In view of the circumstances mentioned above, this invention has been done to solve the problem inherent in the prior art, and its object is to provide a calking structure wherein the calked member is calked firmly in the fixed member and a jig intended for calking.

In a calking structure wherein a calking aperture is formed in a fixed member, a calked member is inserted through the calking aperture, the calked member has cut faces cut in to form a plurality of calking pieces, the calking pieces are bent away from the cut edges and in opposite directions with respect to each other, and twisted thereby locking the calked member to the fixed member, the above object is attained by bending each calking piece in the direction slanting counter to the cut faces.

Further, in a jig intended for calking wherein a pair of cutting edges are formed, a calked member inserted through a calking aperture formed in a fixed member has cut faces cut in by the cutting edges to form a plurality of calking pieces, the calking pieces are bent by the cutting edges and depressed to a peripheral edge portion of the calking aperture, thereby locking the calked member to the fixed member, the aforementioned object is attained by a construction improved such that each cutting edge has a slant face portion comprising first and second slant faces orthogonal substantially each other to bend the calking pieces in the direction inclined to the cut faces, thereby bending each calking piece in the counter direction; and still further, the object is attained by a construction improved such that the cutting edges have one slant face to bend the calking pieces in the direction inclined to the cut faces, thereby bending the calking pieces in a direction both away from the cut faces and in opposite directions with respect to each other, and twisting the calking pieces.

According to the first aspect of this invention, the calking pieces formed from being cut in the calked member are depressed onto, brought into and thus locked to each edge portion of the calking aperture of the fixed member. Thus the calking pieces are locked firmly to the fixed member.

Further, according to the second aspect of this invention, since slant faces are formed on the cutting edges of the calking jig, from forming the calking pieces by cutting in the calked member, the calking pieces are depressed by the slant faces and deformed in the direction inclined to the cut faces. Accordingly, the calking pieces are depressed onto each edge portion of the calking aperture and thus locked firmly to the fixed member.

DETAILED DESCRIPTION OF PREFERRED EMBODIMENTS

Figure 1:
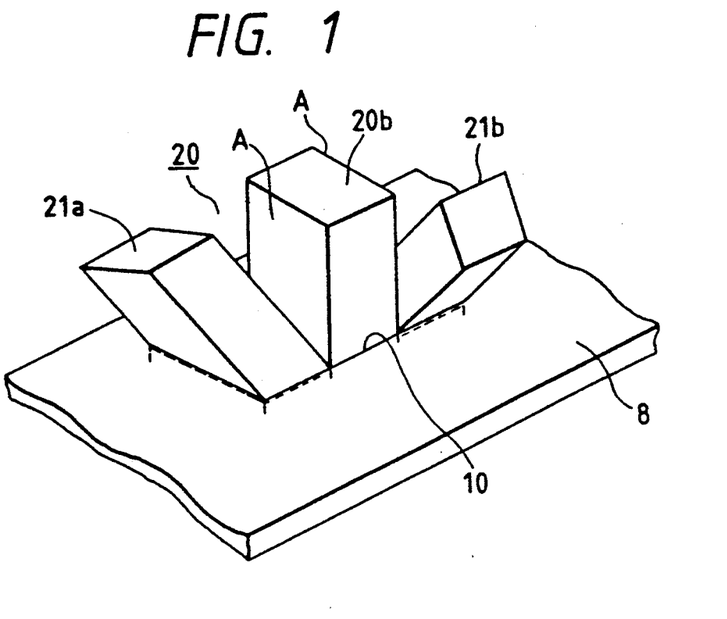
FIG. 1 is a perspective view of a calking structure given in a first embodiment of this invention.
Figure 2:
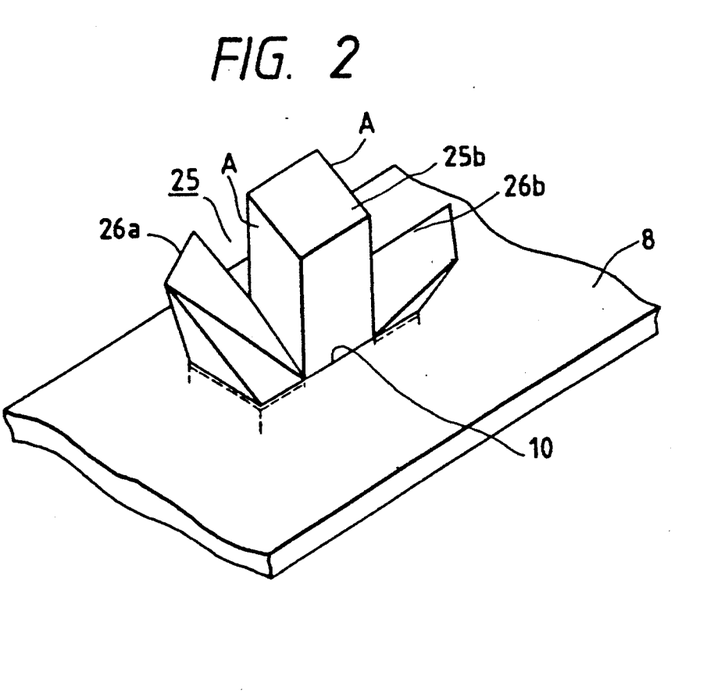
FIG. 2 is a perspective view of a calking structure given in a second embodiment of this invention.

With reference to the accompanying drawings FIG. 1 to FIG. 6, preferred embodiments of this invention will be described on the basis of a process for forming a calking structure by means of a jig intended for calking. Here, FIG. 1 is a perspective view of a calking structure relating to a first embodiment, FIG. 2 is a perspective view of a calking structure relating to a second embodiment, FIG. 3 is a perspective view of a calking jig relating to the first embodiment, FIG. 4 is a perspective view of a calking jig relating to the second embodiment, FIG. 5 (a), (b) and (c) are a front view, a side view and a bottom view respectively of the calking jig relating to the first embodiment, FIG. 6 (a), (b) and (c) are a front view, a side view and a bottom view respectively of the calking jig relating to the second embodiment.

Figure 3:
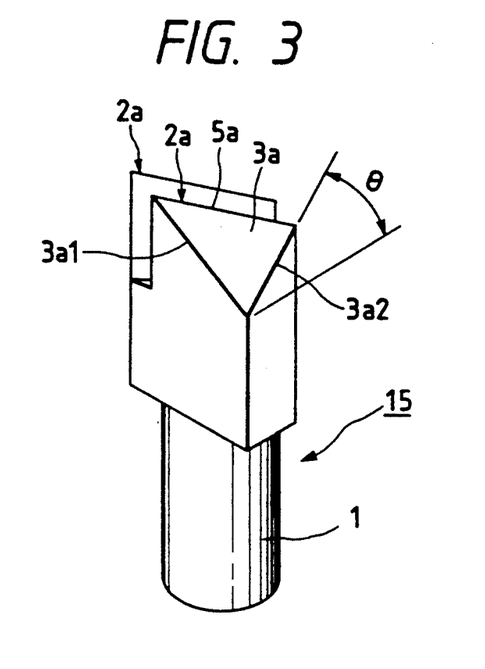
FIG. 3 is a perspective view of a calking jig given in the first embodiment of this invention.
Figure 4:
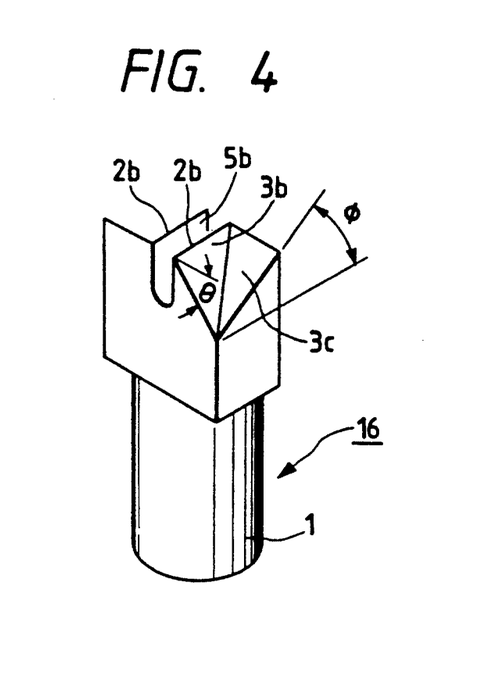
FIG. 4 is a perspective view of a calking jig given in the second embodiment of this invention.
Figure 5A:
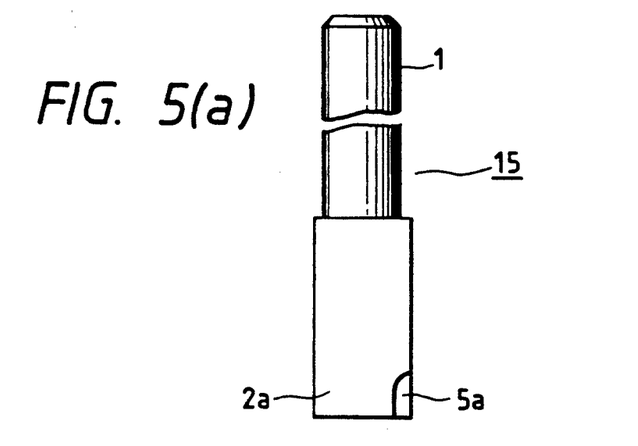
FIGS. 5(a), 5(b) and 5(c) are front, side and bottom views, respectively, of the calking jig given in the first embodiment of this invention.
Figure 5B:
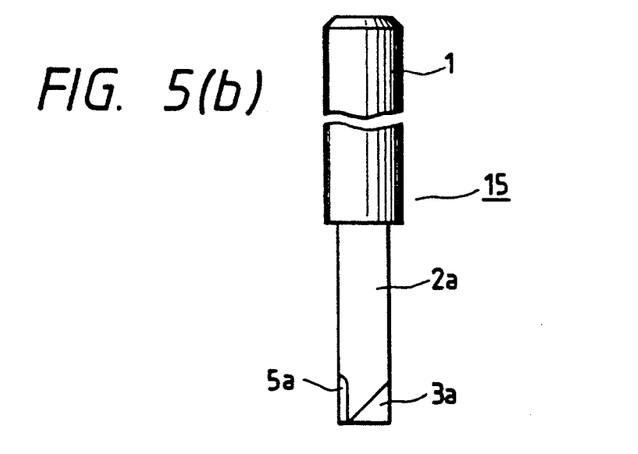
Figure 5C:
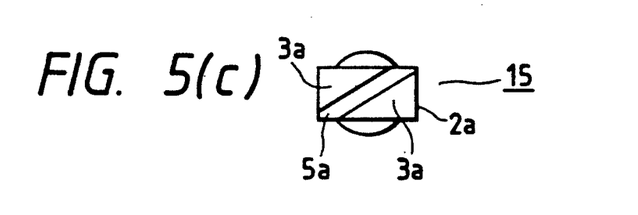

A calking jig 15 relating to the first embodiment is provided, as shown in FIG. 3 and FIG. 5, with a rectangular body on an end portion of a shaft 1, and a recessed groove 5a is formed on an upper surface of the rectangular body at a diagonal line position. Further, slant faces 3a, 3a at an angle $\theta$ from opposite side edges of the recessed groove 5a to the upper surface are formed on the upper surface of the rectangular body. Accordingly, peripheral edges of the slant faces 3a, 3a form a vertex-dislocated inequilateral triangle each with the tip as a base. Thus opposite edge portions of the recessed groove 5a are made to work as two cutting edges 2a, 2a.

Next, a calking process for which the calking jig 15 is used will be described. As shown in FIG. 1 and FIG. 3, the rectangular calking aperture 10 is formed on the fixed member 8 such as bus bar or the like. A nose portion of a calked member 20 such as fixed contact or the like is inserted in the calking aperture 10. The cutting edges 2a, 2a of the calking jig 15 are then disposed to face on opposite ends of the calked member 20 having passed through the calking aperture 10, and from thrusting the calking jig 15 therein, the calked member 20 has cut faces A cut in as leaving a salient 20b, and calking pieces 21a, 21b are formed. Then, as a result of pressing the calking jig 15 against the calking member, the calking pieces 21a, 21b are bent outward in opposite directions to each other by the slant faces 3a, 3a of the calking jib 15. Additionally, since opposite sides 3a1, 3a2 of the slant faces 3a are asymmetrical with reference to the tip of the cutting edge 2a, the calking pieces 21a, 21b are also twisted. In such manner the calking pieces 21a, 21b are depressed to the slant face 3a and cut into two adjacent edge sides of the calking aperture 10 of the fixed member 8.

Thus, in the first embodiment, the calking pieces 21a, 21b are calked in a longitudinal edge side of the calking aperture 10 and an edge side in the cross direction of the calking aperture 10 respectively, and hence the calking structure will mechanically be locked very firmly and so obtained to be free from a play or lost motion to arise without using an adhesive subsidiarily as ever before.

Figure 6A:
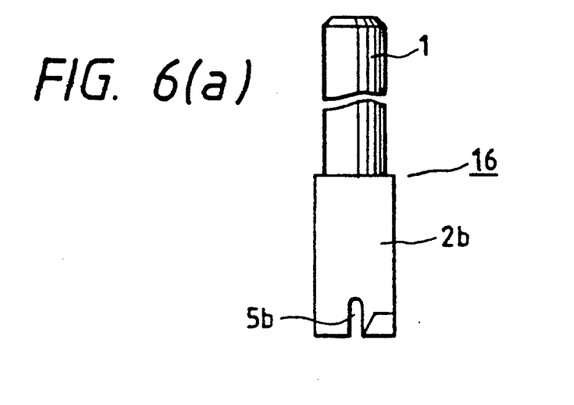
FIGS. 6(a), 6(b) and 6(c) are front, side and bottom views, respectively of the calking jig given in the second embodiment of this invention.
Figure 6B:
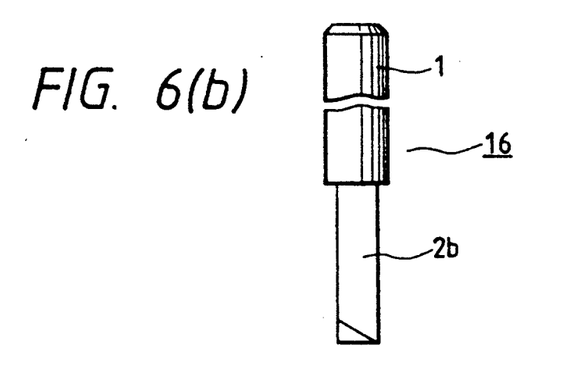
Figure 6C:
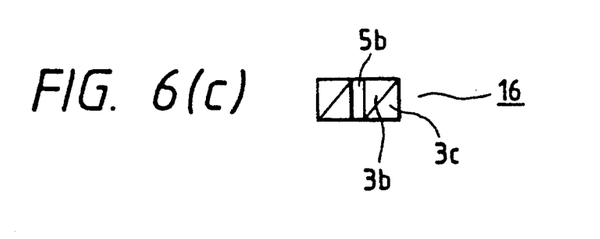

A calking jig 16 relating to the second embodiment is provided, as shown in FIG. 4 and FIG. 6, with a rectangular body on an end portion of the shaft 1, and a recessed groove 5b is formed on an upper surface of the rectangular body in the cross direction centrally thereof. Further, as shown in FIG. 4, a slant face 3b at an angle $\theta$ from a side edge of the recessed groove 5b is formed, and a slant face 3c at an angle $\phi$ from a side edge of the upper surface is also formed. The slant faces 3b, 3c are disposed orthogonally with respect to each other.

Described next is a calking process for which the calking jig 16 is used. As shown in FIG. 2, the rectangular calking aperture 10 is formed on the fixed member 8, and a nose portion of a calked member 25 is inserted in the calking aperture 10. Cutting edges 2b, 2b of the calking jig 16 are then disposed to face on an end surface of the calked member 25 having passed through the calking aperture 10, and from thrusting the calking jig 16 therein, the calked member 25 has the cut face A formed as leaving a salient 25b, and thus calking pieces 26a, 26b are formed. Then, from keeping the calking jig 16 thrusted continuously, the calking pieces 26a, 26b cut in and so formed are depressed by the opposite slant faces 3b, 3c and cut into the fixed member 8.

Thus in the second embodiment described above, a working effect similar to the foregoing first embodiment is also obtainable.

As described above, according to the calking structure of each embodiment, calking pieces of the calked member are calked and locked firmly in the edge sides longitudinal and in the cross direction of the calking aperture 10 of the fixed member 8, thus these need not be locked subsidiarily by an adhesive, the manufacturing time is shortened, and the manufacturing cost is also decreased.

Further, the calking jig of each embodiment can be fabricated easily in a simple structure, a displacement depressing operation is ready simultaneously with a series of cutting operation for the calked member, and the calked member can be calked firmly in the peripheral edge portions longitudinal and in the cross direction of the calking aperture of the fixed member.

Besides, in each embodiment described hereinbefore, sides of the salients and the cut face A (Path of the tip) are of a plane as leaving the salients 20b, 25b, however, the cutting may be effected so as not to leave the salients.

According now to the calking structure of this invention, a firm calking for which an adhesive need not be used in particular is obtainable through reducing the manufacturing time and cost.

According further to the calking jig of this invention, the calking pieces can be calked firmly in a wide area of the peripheral edge portions longitudinal and in the cross direction of the calking aperture of the fixed member.

What is claimed is:

1. A calking jig for connecting a calked member to a fixed member, the calked member having an end extending through an aperture formed in the fixed member, the calking jig comprising:

a shaft having an axis;

a body having a fixed end connected to the shaft and a free end, the body defining first and second parallel cutting edges formed on the free end, a slot formed between the first and second cutting edges, and a plurality of cutting surfaces formed on the free end on sides of the first and second cutting edges opposite to the slot;

wherein the cutting surfaces are formed such that when the jig is pressed against the end of the calked member in a direction along the axis, the calked member is cut by the cutting edges into a salient, a first calking piece and a second calking piece, the salient being received in the slot, the first calking piece is bent away from the calking jig and twisted relative to the axis of the calking jig, and the second piece is bent away from the calking jig in a direction opposite to the first piece and twisted relative to the axis of the calking jig.

2. A calking jig according to claim 1 wherein the body has a rectangular cross section including first and second diagonal corners and third and fourth diagonal corners, the slot being located diagonally between the first and the second diagonal corners; and wherein the calking jig comprises:
a first triangular cutting surface extending from the first cutting edge to the third corner; and
a second triangular cutting surface extending from the second cutting edge to the fourth corner.

3. A calking jig according to claim 1 wherein the body has a rectangular cross section including first and second parallel sides and third and fourth parallel sides, the first and second parallel sides being longer than and perpendicular to the third and fourth parallel sides, the first and fourth sides meeting at a first corner and the second and third sides meeting at a second corner, and the first and second cutting edges extend from the first to the second parallel sides and are parallel to the third and fourth parallel sides; and wherein the calking jig comprises:
a first triangular cutting surface defined by the first cutting edge, the second side and a first line extending from the intersection of the first cutting edge and the first side to the second corner;
a second triangular cutting surface defined by the first side, the third side and the first line;
a third triangular cutting surface defined by the second cutting edge, the first side and a second line extending from the intersection of the second cutting edge and the second side to the first corner; and
a fourth triangular cutting surface defined by the second side, the fourth side and the second line.

* * * * *